May 28, 1968  M. TOBIAS  3,384,959

SCORING DEVICE

Filed June 19, 1967

INVENTOR.
MAURICE TOBIAS
BY
his ATTORNEYS

United States Patent Office 3,384,959
Patented May 28, 1968

3,384,959
SCORING DEVICE
Maurice Tobias, 106 W. 69th St.,
New York, N.Y. 10023
Filed June 19, 1967, Ser. No. 646,921
8 Claims. (Cl. 30—24)

ABSTRACT OF THE DISCLOSURE

The present application discloses means for scoring the outermost layers of an onion skin to facilitate the removal thereof while obviating the release of onion juice with its included lachrymatory aromatics. As onion peel is of varying thickness, the present invention teaches varying the penetration of the scoring device into the section of the onion, whereby, as the device is drawn across the vegetable, only a predetermined minimum depth is scored.

---

This invention relates generally to scoring the thin, outside skin or petal of a vegetable; and more particularly, to a novel means for facilitating the removal of onion skin with a minimum release of lachymatory aroma.

It is well known that the juice of onions contains a lachrymatory aromatic that is quite irritating to eyes and mucous membranes. The problem associated with peeling an onion arises from the fact that an onion is built up of many layers of pliant tissue, each layer having a skin enclosing onion juice within. The outside layer of skin tissue, or peel, is dried and dead and requires removal before the onion can be utilized. If, in removing the skin, several of the moist, inside layers of the onion are inadvertently torn open, the aromatic onion juice containing the lachrymator escapes into the atmosphere to annoy and disturb those in the vicinity. Moreover, when peeled in such a manner, the evil smell of onion juice frequently lingers on the hands for hours.

On the other hand, by scoring only the dried, outside skin and no more, upon removal of the scored skin, no lachrymatory aroma is released to disturb those in the vicinity. However, as the horny outside skin of the onion is thicker at the midsection and thinner at its stalk, a successful onion scoring device preferably should have provision for variable penetration of the onion if only a single layer of the onion tissue is to be scored in any one operation.

Furthermore, in vegetables, such as onions and the like, higher food values lie closer to the skin of the vegetable. Accordingly, for optimum nutrition, only a minimum of the outside peel of the vegetable should be removed prior to cooking.

This invention is primarily directed to preventing the undesirable cutting of the moist layers of the onion bulb, and therefore completely obviating the escape of undesirable onion juices onto the hands and attendant liberation of lachrymatory aroma into the environs.

It is, therefore, the main object of the present invention to provide novel means for scoring or scratching the surface of an onion so that only the hard, relatively moisture-free, outside layer of the onion is pierced, leaving the scratched surface onion skin in a readily removable state without attendant cutting or tearing of any of the inner, moist layers.

Another object of the present invention is to provide a device for scoring a thin-skinned vegetable that is inexpensive, and easily and rapidly used, yet retains general utility in the kitchen.

It is a further object of the invention to place thin-skinned vegetables in condition for peeling in a rapid and safe manner offering a minimum opportunity of cutting the hands of the user.

Figure 1:
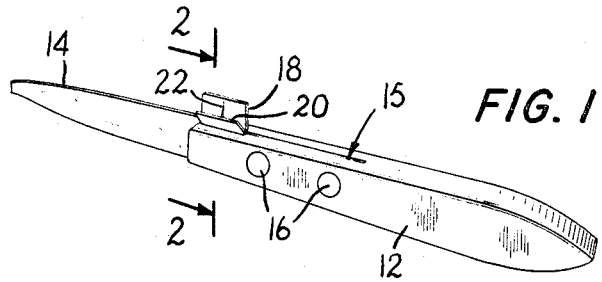
Figure 2:
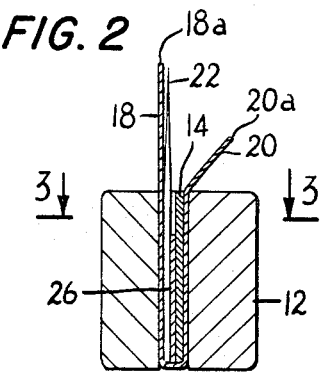
Figure 3:
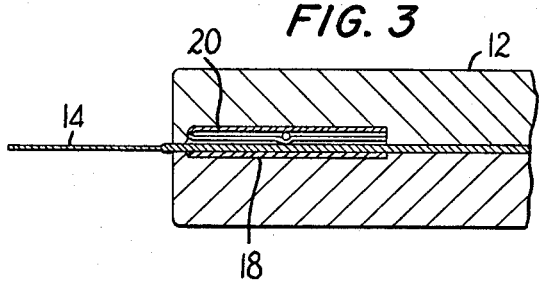
Figure 4:
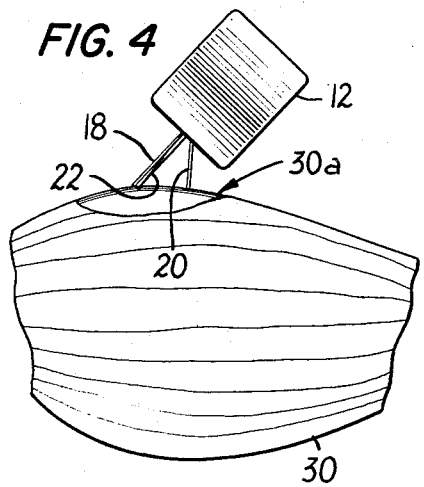
Figure 5:
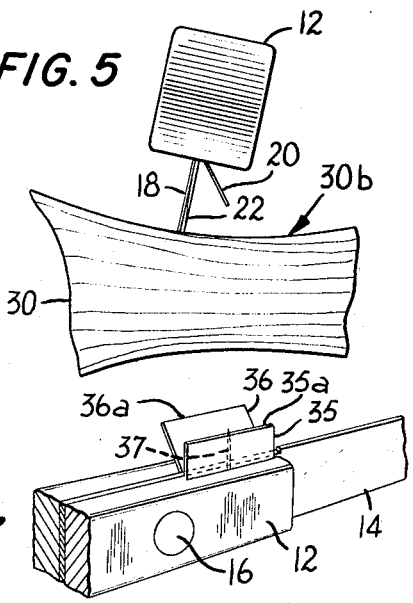
Figure 6:
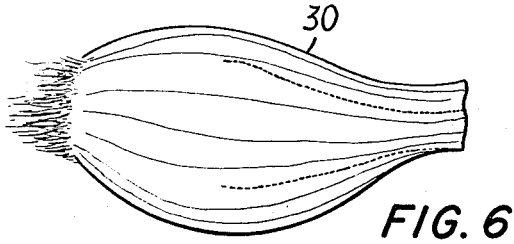

The foregoing and other objects, features and advantages of this invention will become apparent from the following details and descriptions thereof, when taken in conjunction with the attached drawings in which:

FIG. 1 is a perspective view of a knife embodying the present invention;
FIG. 2 is a cross-sectional view of the scoring device in accordance with the present invention;
FIG. 3 is a partial top view of the improved scorer;
FIG. 4 shows the present invention in use;
FIG. 5 shows the present invention in use adjacent the stalk end of an onion;
FIG. 6 shows an onion after scoring, ready to be peeled; and
FIG. 7 is a partial, perspective view of another embodiment of the present invention.

FIGURE 1 shows a knife composed of a handle 12 and a blade portion 14 inserted into a slot 15 in handle 12 and secured by means of rivets 16 passing through the handle and blade in conventional manner. The blade 14 is bent slightly at the tip to better fit about the circumference of an onion to aid in the removal of scored peel from the onion.

Referring to FIGURE 2, the knife blade 14 is sandwiched between a vertical guard 18, shown in a position parallel with the knife blade and a forward guard 20 at an acute angle to vertical guard 18. For convenience the two guards 18 and 20 are shown formed of one U-shaped piece of material. They could, however, be formed of two separate pieces. The two outside edges of the vertical and forward guards, 18a and 20a respectively, define a plane. The two guards 18 and 20 embrace a scoring needle 22 and a spacing element 26. The scoring needle 22, because its diameter decreases as it comes to a point, touches the forward guard 18 at its base but is separated from the forward guard 18 at its point.

From FIGURE 3 it is evident that spacer 26 is preferably composed of a yielding, yet firm metal such as tin or aluminum which serves to secure the scoring needle 22 and hold it in position within the U of the two guards 18 and 20 securely against the guard 18. When used in conjunction with a kitchen knife as herein shown, the rivets 16 will provide sufficient force to maintain the elements in position.

It should be noted that, although the needle is retracted below the edge, 18a, of the vertical guard, it just pierces the surface of the plane defined by edges 18a and 20a.

The skin of an onion is not of uniform thickness, the skin at the midsection being thicker and harder than the thin, spongy, easily damaged skin at the stalk end. Accordingly, for optimum removal of the skin, that is, for a penetration of only one layer of skin and attendant minimum release of lachrymatory aroma, the depth of penetration of the scoring needle 22 should be closely controlled to be relatively deeper at the midsection and more shallow at the stalk end of the onion.

Referring to FIGURE 4, it is seen that when the forward guard 20 and the vertical guard 18 are placed in contact with the onion at the midsection, due to the convex shape of the onion, scoring needle 22 will just pierce the outermost surface layer of the onion. Accordingly, as the device is drawn down the onion to the stalk, the surface will be scored or scratched. Due to the change in the shape of the surface of the onion from convex at the midsection to concave near the stalk, when the device is in the area of the stalk, with both guards resting on the surface of the onion, the needle will penetrate to a lesser extent than when it is at the midsection.

In normal use the onion is held in the left hand of the user and the scoring device of the present invention in the right. It is intended that as the device is normally drawn by the user from the midsection 30a of the onion 30, shown in FIG. 4, to the upper stalk section 30b of the onion, as shown in FIG. 5, the device in normal operation will twist slightly. This will have the effect of lifting the forward guard off the surface of the onion, resulting in even less penetration of the scoring needle 22 into the thin outer layer of the onion. Although needle 22 is below the upper edge 18a of the vertical guard, very slight penetration of the onion will nevertheless occur as the onion will deform under the pressure of vertical guard 18 causing a slight roll of peel up into the scoring needle 22. This will be sufficient to score the thinner layers of the onion bulb at the stalk end.

It is intended that the present device be utilized by scoring the onion in three or four places, as depicted at FIG. 6, at which point the peel or horny layer of the onion can be peeled back much like the skin of a banana or the petals of a flower.

It has been found that, for superior operation, the correct penetration of the scoring needle 22 will obtain when the forward guard 20 is at a 40° angle to the vertical guard 18. Further, at this point, the scoring needle 22 should preferably be positioned $1/64$ of an inch away from the vertical guard 18 and retracted approximately $1/128$ of an inch below the top of the vertical guard 18. Customarily, the vertical guard extends $5/16$ of an inch from the handle 12. In the preferred embodiment of this invention the forward guard 20 extends $3/16$ of an inch from the handle 12.

In the alternate embodiment of the present invention shown in FIG. 7, the forward guard 36 is longer than the vertical guard 35. Accordingly, the scoring needle 37, must protrude above the upper edge 35a of the vertical guard 35 to impinge upon the plane defined by the upper edges of the guards 36a and 35a. The operation of this device is similar to that described in the other figures.

It is to be understood that the invention is here shown combined with a kitchen knife for convenience as, when scored, the blade of the knife is convenient to fleck-off the skin from the core of the vegetable. Additionally, often the operation of cooking requires peeling in conjunction with dicing and cutting of the vegetable. It will be apparent that the apparatus of the present invention could be placed upon a handle, absent the knife, for use in a commercial kitchen.

Various other modifications of the examples illustrated and described herein may occur to those skilled in the art, and accordingly, it is intended that the invention be limited only by the scope of the appended claims.

I claim:
1. A device for scoring a vegetable having a skin preparatory to the removal thereof, which comprises:
 (A) a base;
 (B) a first guard member mounted on the base and coming to a first free edge therefrom;
 (C) a second guard member mounted adjacent the first member on the base and coming to a second free edge therefrom such that the first and second edges are substantially parallel and thereby define a plane, the first and second members defining an angle, the device during the scoring of the vegetable adapted to be positioned with both of the edges in contact with the vegetable; and
 (D) a scoring element mounted on the device and having a point at one end, said element being closer to one of said guard members than the other with said point extending substantially to said plane a distance sufficient to penetrate a predetermined minimum distance into the skin of the vegetable as the device, the edges in contact with the vegetable, is drawn thereacross.

2. Apparatus according to claim 1, wherein:
 (A) the guard member closer to the scoring element is longer than the other guard member; and
 (B) the point of the element is disposed approximately $1/64$ inch from the edge of the guard member closer to the scoring element and $1/128$ inch therebelow.

3. Apparatus according to claim 2, wherein:
 (A) the first and second guard members are formed out of a single part which secures the scoring element within the base.

4. In a kitchen utility knife composed of a blade and a handle, the improvement for scoring the skin of an onion to facilitate the removal of the skin which comprises:
 (A) a first flat plate mounted on the handle and extending outward from the handle to a first free edge therefrom;
 (B) a second flat plate mounted on the handle and extending outward to a second free edge therefrom, the second plate mounted on the knife at an angle to the first plate so that the second edge is substantially parallel to the first edge, the edges defining a plane, the plates dimensioned so that they rest upon the onion with the two free edges in contact with the skin thereof when in position for scoring;
 (C) a scoring element mounted on the knife and having a point at one end, said element being closer to one of the flat plates than the other with the point extending substantially to said plane a distance sufficient to penetrate to a predetermined depth into the skin of the onion and accomplish the scoring.

5. Apparatus according to claim 4, wherein:
 (A) the blade has a bent tip adapted to fit about the circumference of the onion to aid in the removal of the scored peel from the onion.

6. Apparatus according to claim 5, wherein the angle is acute.

7. Apparatus according to claim 6, wherein:
 (A) the scoring element is disposed approximately $1/64$ inch from the edge of the flat plate closer to said scoring element and retracted $1/128$ inch therebelow.

8. Apparatus according to claim 7, wherein:
 (A) the first and second plates are joined within the handle and secure the scoring element.

References Cited

UNITED STATES PATENTS

| | | | |
|---|---|---|---|
| 2,621,659 | 12/1952 | Greene. | |
| 1,489,813 | 4/1924 | Bewsick | 30—366 |
| 1,771,296 | 7/1930 | Harley et al. | 30—24 X |
| 2,521,245 | 9/1950 | Murphy | 30—24 X |
| 2,591,409 | 4/1952 | Dahl. | |
| 3,237,299 | 3/1966 | Gibbs | 30—24 |

OTHELL M. SIMPSON, *Primary Examiner.*

G. WEIDENFELD, *Assistant Examiner.*